US008275969B2

(12) United States Patent
Moran et al.

(10) Patent No.: US 8,275,969 B2
(45) Date of Patent: Sep. 25, 2012

(54) STORAGE WITH PERSISTENT USER DATA

(75) Inventors: Dov Moran, Kfar Saba (IL); Eyal Bychkov, Hod Hasharon (IL)

(73) Assignee: Sandisk IL Ltd. (IL)

( * ) Notice: Subject to any disclaimer, the term of this patent is extended or adjusted under 35 U.S.C. 154(b) by 1013 days.

(21) Appl. No.: 11/061,628

(22) Filed: Feb. 22, 2005

(65) Prior Publication Data

US 2006/0031632 A1 Feb. 9, 2006

Related U.S. Application Data

(60) Provisional application No. 60/598,788, filed on Aug. 4, 2004.

(51) Int. Cl.
*G06F 12/00* (2006.01)
(52) U.S. Cl. ........... 711/173; 711/129; 711/E12.046
(58) Field of Classification Search ........... 711/173, 711/129
See application file for complete search history.

(56) References Cited

U.S. PATENT DOCUMENTS

| 5,389,945 | A | 2/1995 | Sheridon |
| 5,404,485 | A | 4/1995 | Ban |
| 6,330,648 | B1 | 12/2001 | Wambach et al. |
| 6,728,830 | B1 * | 4/2004 | Assaf ............... 711/112 |
| 6,857,068 | B1 * | 2/2005 | Moller et al. ............. 713/2 |
| 7,054,990 | B1 * | 5/2006 | Tamura et al. ......... 711/103 |
| 7,058,808 | B1 * | 6/2006 | Zolotorev et al. ....... 713/176 |
| 7,096,469 | B1 * | 8/2006 | Kubala et al. ......... 718/100 |
| 7,594,135 | B2 * | 9/2009 | Gonzalez et al. ......... 714/5 |
| 2002/0174283 | A1 * | 11/2002 | Lin ............... 711/1 |
| 2002/0194440 | A1 * | 12/2002 | Ghosh et al. ............ 711/156 |
| 2003/0070034 | A1 * | 4/2003 | Friedman et al. ......... 711/103 |
| 2003/0163622 | A1 | 8/2003 | Moran |
| 2003/0221093 | A1 * | 11/2003 | Touchet .............. 713/1 |
| 2004/0025003 | A1 * | 2/2004 | Stevens ............... 713/2 |
| 2004/0059885 | A1 * | 3/2004 | Farmer et al. ........... 711/164 |
| 2004/0228487 | A1 * | 11/2004 | Maeda et al. .......... 380/232 |
| 2004/0255053 | A1 * | 12/2004 | Kang ............... 710/1 |
| 2004/0255145 | A1 * | 12/2004 | Chow ............... 713/200 |
| 2005/0015542 | A1 * | 1/2005 | Kroening ............. 711/112 |
| 2005/0021919 | A1 * | 1/2005 | Kroening ............. 711/165 |

FOREIGN PATENT DOCUMENTS

EP 1 063 589 12/2000

* cited by examiner

*Primary Examiner* — Jared Rutz
*Assistant Examiner* — Aracelis Ruiz
(74) *Attorney, Agent, or Firm* — Martine Penilla Group, LLP

(57) ABSTRACT

A data storage area of a data storage device is partitioned logically between a user storage area and a device storage area. Source data stored securely in the device storage area is copied as derivative data to the user storage area, or is used as a basis for creating derivative data stored in the user storage area, whenever the data storage device is initialized. In one embodiment, the data storage area is read-write and the device storage area has embodied thereon device system code, executed by a controller of the data storage device, for writing source data to the device storage area only if the source data satisfies a predetermined condition. Examples of derivative data include an autorun file, a volume label and user identification. Data from a host may be stored reversibly in the user storage area but must be stored securely in the device storage area.

29 Claims, 5 Drawing Sheets

STORAGE WITH PERSISTENT USER DATA

This patent application claims the benefit of U.S. Provisional Patent Application No. 60/598,788, filed Aug. 4, 2004

FIELD AND BACKGROUND OF THE INVENTION

The present invention relates to storage devices for computers, and in particular to such storage devices that include programmed controllers to manage their operation.

Storage devices are part of every computer or computerized appliance. Such storage devices employ a variety of storage technologies, such as magnetic, optical or nonvolatile solid-state disks, with additional storage technologies emerging. Some storage devices are embedded within a computerized device, while others are removable and can be attached to many hosts.

Some storage devices include programmed controllers to control read and write operations. For example, flash storage devices include controllers to emulate standard block storage devices, as well as to manage error-correction and wear-leveling.

FIG. 1 is a high-level block diagram of an exemplary prior art flash storage device 110 connected or connectable to a host 105. Device 110 includes a data storage area 120+130, a controller 100 that accesses storage area 120+130 and manages error-correction and wear-leveling under techniques that are well-known in the art of flash memories (see for example U.S. Pat. No. 5,404,485 to Ban, which is included by reference for all purposes as if fully set forth herein). An interface 102 serves to exchange data with, and optionally also to draw electrical power from, host 105. If storage device 110 is removable from host 105, interface 102 can use interfaces such as Universal Serial Bus (USB), CompactFlash™, SecureDigital™, MultimediaCard™, SmartMedia™, MemoryStick™ and the like. If storage device 110 is embedded within host 105, interface 102 usually uses an IDE or SCSI interface. Host 105 can be a personal computer such as a desktop, laptop or palmtop model, or can be a digital appliance such as a cellular telephone, a personal digital assistant (PDA), a digital camera, a music player, or a voice recorder.

Data storage area 120+130 of storage device 110 is divided into a user storage area 120 and a device storage area 130. User area 120 includes user files 122 that a user has created or copied, such as documents, music files or digital images; and service files 124, that can include an operating system, application programs, a file system, and other system tables and files, all enabling the creation, access to and management of user files 122. All files in user area 120 are accessible by host 105, and are usually erased under the control of host 105 upon formatting storage device 110.

Device storage area 130 includes data that serves the operation of storage device 110. A device descriptor 132 includes descriptive and operational parameters accessible by interface 102, usually under well-defined standards. A device system 134 includes programs and data for operating controller 100; thus the operations of access, error-correction and wear-leveling mentioned above are performed by controller 100 by executing programs read from device system storage 134.

While user storage area 120 can be seen as the territory of the host 105, device storage area 130 is the territory of controller 100, guarded strictly by provisions installed by the device manufacturer during production. It is customary that device descriptor 132 is accessible to host 105 for specialized read-only operations, while device system 134 is not accessible to host 105 at all, or requires special utility programs and password-protected permissions for access. In most cases, the user of storage device 110 does not see device storage area 130 and is not aware of its existence.

Files in user area 120 are generally accessible by and visible to users. Such visibility can be enhanced for a selected file by placing the file at the root level of device 110, by employing an Autorun utility to run the file automatically, or by using eye-catching icons. There are scenarios in which specific files need to be visible to a user but not removable by him/her. For example, if the original user has personalized a removable storage device to show his/her name upon insertion into a host, the original user will not want someone who steals or finds the device to erase this identity. If a storage device has been given away by a commercial company and is programmed to show the company's logo and contact details upon insertion into a compatible host 105, that company will want its startup screen to be non-removable. However, existing devices do not support such combination of visibility and persistence because under existing designs, data are either stored in device storage area 130 (FIG. 1) where the data are generally concealed, or are pre-installed to be visible in user storage area 120, where the data are also easily erasable, for example by deleting a file or by reformatting storage device 110 under the control of host 105.

There is therefore a need for storage devices that contain selected "persistent" files in their user storage area and that prevent the erasure of such files by the user.

SUMMARY OF THE INVENTION

The object of the present invention is to provide storage devices that can contain persistent data in their user storage areas, and prevent the permanent deletion of such data by the user.

According to the present invention there is provided a data storage device including: (a) a controller; (b) a read-write data storage area; and (c) a second data storage area having embodied thereon device system code that is executed by the controller to manage the read-write data storage area, the device system code including code for writing source data received from a host of the data storage device to the read-write data storage area only if the writing of the source data satisfies a predetermined condition.

According to the present invention there is provided a method of managing a data storage device, including the steps of: (a) partitioning a data storage area of the storage device between a user storage area and a device storage area; (b) storing source data in the device storage area; and (c) upon initialization of the data storage device, storing derivative data in the user storage area in accordance with the source data.

According to the present invention there is provided a method of managing a data storage device, including the steps of: (a) partitioning a data storage area of the storage device between a user storage area and a device storage area; and (b) subsequent to manufacture of the data storage device, storing data received from a host: (i) reversibly in the user storage area, and (ii) only securely in the device storage area.

According to the present invention there is provided a data storage device including: (a) a data storage area, partitioned between a user storage area and a device storage area; and (b) a controller for managing the data storage area by steps including: (i) storing source data in the device storage area, and (ii) upon initialization of the data storage device, storing derivative data in the user storage area in accordance with the source data.

According to the present invention there is provided a data storage device including: (a) a data storage area, partitioned between a user storage area and a device storage area; (b) an interface for coupling the data storage device to a host; and (c) a controller for managing the data storage area subsequent to manufacture of the data storage device by steps including storing data received from the host reversibly in the user storage area and only securely in the device storage area.

According to the present invention there is provided a data storage device including: (a) a data storage area having computer-readable data and computer-readable code embodied thereon, the computer-readable data including source data, the data storage area partitioned between a user storage area and a device storage area, the computer-readable code including program code for storing derivative data in the user storage area in accordance with the source data when the data storage device is initialized.

A first data storage device of the present invention includes a controller, a read-write data storage area (as opposed to a write-only data storage area such as a CD-ROM) and a second data storage area. The second data storage area has embodied thereon device system code that is executed by the controller to manage the read-write data storage area. The device system code includes code for writing, to the read-write data storage area, source data received from a host of the data storage device, only if the writing of the source data satisfies a predetermined condition. That the condition is "predetermined" means that the condition is fixed when the device system code is first installed in the device storage area and cannot be altered subsequently.

There are three preferred predetermined conditions.

The first preferred predetermined condition is that the writing of the source data overwrites source data already present in the read-write data storage area for an n-th time is allowed only if n is no greater than a predetermined integer. Most preferably, n=0, which means that, once source data are written to the read-write data storage area, those source data can never be erased or modified subsequently. Nevertheless, the source data may be moved from one physical location to another within the read-write data storage area, for example during internal housekeeping operations such as wear leveling if the read-write data storage area is a flash memory. The persistence of the source data in the read-write data storage area that is provided by the present invention is a logical persistence, not necessarily a physical persistence.

The second preferred predetermined condition is that the writing of the source data is authorized by an authorization that is included in the source data and that indicates permission for the source data to be written to the read-write data storage area. The most preferred authorization includes a predetermined digital signature.

The third preferred predetermined condition is that the source data are written during manufacture of the data storage device. Subsequent to the manufacture of the data storage device, any attempt to write source data to the read-write data storage area will be blocked. One way to enforce this condition is to include, in the code for writing the source data to the read-write data storage area, code that requires the host to identify itself as a host owned by the manufacturer.

Preferably, the data storage device also includes an interface for coupling the data storage device to the host. Most preferably, the coupling of the data storage device to the host is reversible. Alternatively, the coupling of the data storage device to the host is permanent, as in the case in which the data storage device is embedded in the host.

Preferably, the data storage device also includes a display apparatus for displaying at least a portion of the source data.

Preferably, the read-write data storage area is partitioned between a user storage area and a device storage area. Most preferably, the partition between the user storage area and the device storage area is a logical partition that is effected by the controller.

Preferably, the source data includes an identification of an owner of the data storage device.

Preferably, the second data storage area is a part of the read-write data storage area. Alternatively, the second data storage area is a read-only data storage area such as a ROM.

According to a first basic method of the present invention, a data storage area of a data storage device is partitioned between a user storage area and a device storage area. Source data are stored in the device storage area. Upon initialization of the device, derivative data are stored in the user storage area in accordance with the source data. "Derivative" data are data that are derived from the source data. One important special case of "derivation" is merely copying the data from the device storage area to the user storage area.

Preferably, the partitioning of the data storage area between the user storage are and the device storage area is logical partitioning rather than physical partitioning.

Preferably, the storing of the derivative data includes copying one or more files from the source data to the user storage area. Alternatively, the storing of the derivative data includes creating one or more files in the user storage area according to the source data rather than merely copying the files. In either case, most preferably, (one of) the file(s) is an autorun file.

Preferably, the derivative data include a volume label.

Preferably, the source data include a user identification.

Preferably, the storage of the source data in the device storage area is permanent, in the sense that the source data cannot be logically erased or logically overwritten. Nevertheless, the source data may be physically erased or physically overwritten, for example during internal housekeeping operations such as wear-leveling if the data storage device is a flash memory device.

Alternatively, the storage of the source data in the device storage area is not permanent. Instead, the source data may be replaced if appropriate authorization is provided. Specifically, replacement data for replacing the source data are provided, as are an authorization to replace the source data. The authorization is verified, meaning that the validity of the authorization is checked. The source data are replaced with the replacement data only if the verifying succeeds in determining that the authorization is valid. Most preferably, the authorization includes a digital signature.

Preferably, a display apparatus is included in the data storage device and at least a portion of the derivative data are displayed using the display apparatus.

Optionally, at least a portion of the derivative data are copied to a host.

In the primary intended application of the present invention, the derivative data include compulsory data. "Compulsory" data are data that are intended to be present persistently in the user storage area. The reason for storing the source data in the device storage area, and for storing the derivative data in the user storage area in accordance with the source data, whenever the data storage device is initialized, is to ensure that the desired compulsory data persists in the user storage area.

Preferably, the user storage area is read-write.

According to a second method of the present invention, a data storage area of a data storage device is partitioned between a user storage area and a device storage area. Subsequent to the manufacture of the data storage device, data received from a host are stored in the two areas in two different ways. Data are stored in the user storage area either securely or reversibly, and in the device storage area only securely. "Reversible" storage means that the data may be erased or replaced at will. "Secure" storage means that the data either are stored permanently or may be erased or replaced only upon successful verification of an authorization to erase or replace the data. The limitation that the data from the host are stored in this manner subsequent to the manufacture of the data storage device excludes from the scope of the invention e.g. secure storage, in the device storage area, by a host to which the data storage device is coupled during manufacture, of a device descriptor and of device system code for managing the data storage device.

Preferably, the user storage area is read-write.

A data storage device corresponding to the first method of the present invention includes a data storage area partitioned between a user storage area and a device storage area, and a controller for managing the data storage area. Specifically, the controller stores source data in the device storage area and stores derivative data in the user storage area in accordance with the source data when the data storage device is initialized.

Preferably, the partition between the user storage area and the device storage area is a logical partition that is effected by the controller.

Preferably, the controller is operative to store the source data in the device storage area permanently. Alternatively, the controller is operative to replace the source data in the device storage area, contingent on successful verification of an authorization to replace the source data.

Preferably, the data storage device also includes a display apparatus for displaying at least a portion of the derivative data.

Preferably, the data storage device also includes an interface for coupling the data storage device to a host in order to exchange data with the host. The exchange of data includes copying at least a portion of the derivative data to the host. Most preferably, the coupling of the data storage device to the host is reversible. Alternatively, the coupling of the data storage device to the host is permanent, as in the case in which the data storage device is embedded in the host.

Preferably, the derivative data include compulsory data.
Preferably, the user storage area is read-write.

A data storage device corresponding to the second method of the present invention includes a data storage area partitioned between a user storage area and a device storage area, an interface for coupling the data storage device to a host, and a controller for managing the data storage area. Specifically, subsequent to the manufacture of the data storage device, the controller stores data received from the host in the data storage area, as follows: Data from the host may be stored either securely or reversibly in the user storage area, but data from the host must be stored securely in the device storage area.

Preferably, the user storage area is read-write.

Another data storage device corresponding to the first method of the present invention includes a data storage area in which is embodied computer-readable data and computer-readable code. The computer-readable data include source data. The data storage area is partitioned between a user storage area and a device storage area. The computer readable code includes program code for storing derivative data in the user storage area in accordance with the source data when the data storage device is initialized.

Preferably, the data storage device also includes a controller for executing the program code.

Preferably, the computer readable code also includes program code for effecting the partition of the data storage area between the user storage area and the device storage area.

Preferably, the derivative data include compulsory data.
Preferably, the user storage area is read-write.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of storing user data persistently in a data storage device. Specifically, the present invention can be used to permanently personalize a data storage device.

The principles and operation of a data storage device according to the present invention may be better understood with reference to the drawings and the accompanying description.

Figure 1:
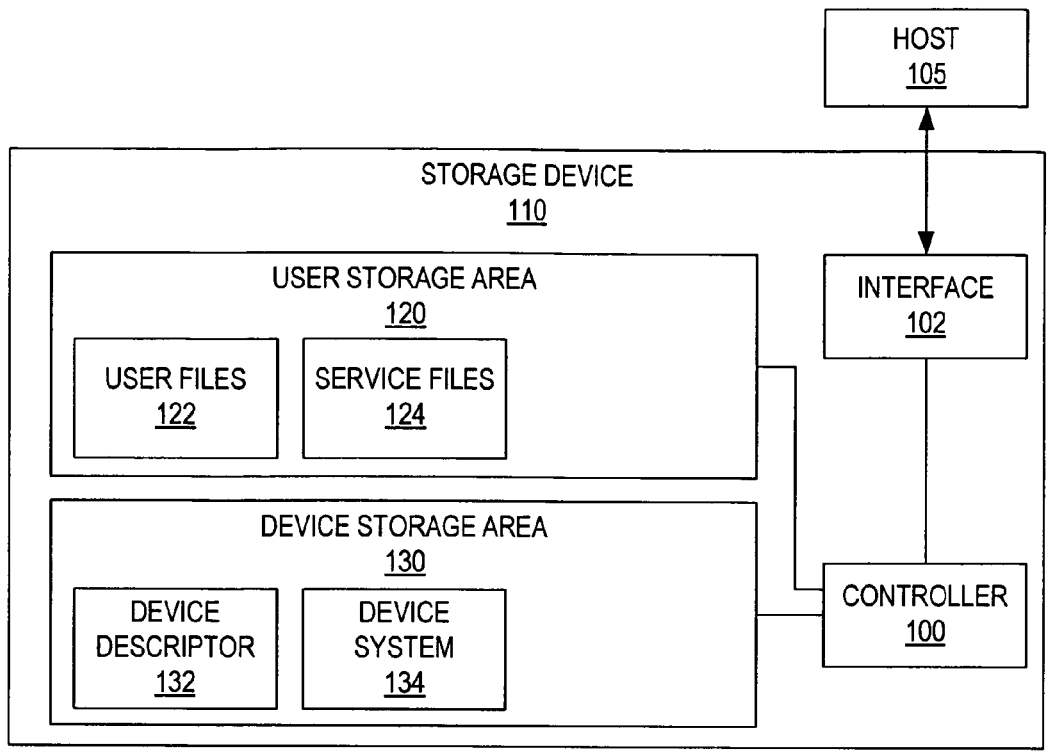
FIG. 1 is a high-level block diagram of a prior art storage device.
Figure 2:
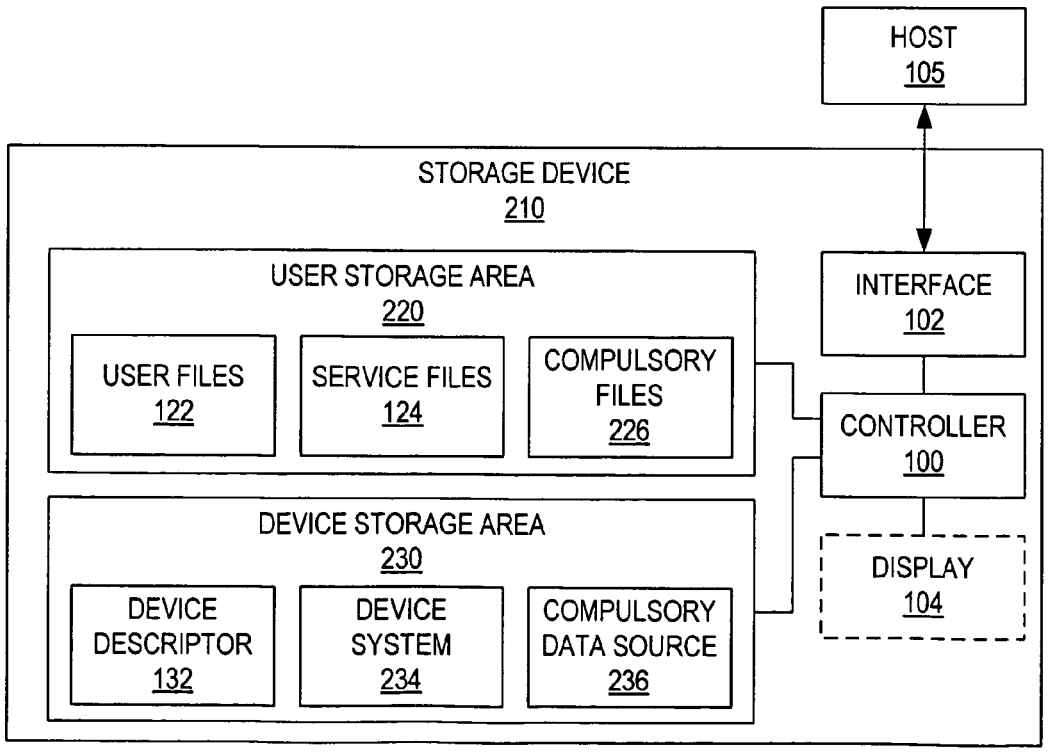
FIG. 2 is a high-level block diagram of a storage device according to a preferred embodiment of the present invention.

Returning now to the drawings, reference is made to FIG. 2, which is a high-level block diagram of a storage device 210 constructed according to a preferred embodiment of the present invention. Storage device 210 is permanently or removably connected to host 105 for data exchange, similarly to how prior-art storage device 110 is connected to host 105 in FIG. 1. A user storage area 220 contains user files 122 and service files 124, similarly to user storage area 120 of FIG. 1. User storage area 220 also contains compulsory files 226. A display 104 is optional, for displaying data from a device storage area 230, such as a user identification, under the control of controller 100. Preferably, display 104 uses an "electric paper", i.e. a screen that retains its displayed content upon power cutoff, as described, for example, in U.S. Pat. No. 5,389,945 to Sheridon, which patent is incorporated by reference for all purposes as if fully set forth herein.

Compulsory files 226 are conventionally accessible to host 105 via the operating system and the file system of host 105. The operating system and the file system of host 105 may be loaded from user files 122 and service files 124 or alternatively from another storage device (not shown) that is connected to host 105. Examples of compulsory files 226 include: an Autorun program file that runs automatically upon storage device 210 being turned on or connected to host 105, an application program that resides in the root directory of storage device 210, and a document file that has an eye-catching icon and that appears, e.g. according to the Windows™ operating system, under the "My Documents" folder. It is the interest of either the owner of storage device 210 or someone who gave storage device 210 to the user to make such compulsory files persistent, i.e. to prevent the permanent removal of such files by someone connecting storage device 210 to a host such as host 105 and deleting a compulsory file or formatting the entire user storage area 220. To make the compulsory files persistent, the method of the present invention rewrites such files to user storage area 220 if such files have been removed or modified, as is described in more detail with reference to FIGS. 6A-6B below.

Device storage area 230 includes device descriptor area 132 similar to that of FIG. 1. Device storage area 230 also includes an extended device system 234 that includes, in addition to the code included in prior art device system 134, also program code to run on controller 100 according to the steps described in FIGS. 4-6B below, for ensuring the persistence of compulsory files 226 in user storage area 220. Compulsory data source 236 includes copies of the compulsory files 226 to be included in user storage area 220, or at least critical data to be embedded in such files. For example, if a compulsory file 226 is an Autorun file that displays a welcome screen with a company name when storage device 210 is connected to the host, then this Autorun file can be constructed by extended file system 234 using a fixed format embedded therein in combination with the company's name read from compulsory data source 236.

It will be noted that the division of data storage area 220+230 between user storage area 220 and device storage area 230, as well as the division of user storage area 220 among blocks 122, 124 and 226, and the division of device storage area 230 among blocks 132, 234 and 236, are logical divisions rather than physical divisions, as is customary under common operating systems and file systems. For example, if storage device 210 is a flash memory device, as a result of wear-leveling, a particular physical portion of data storage area 220+230 may contain data from user storage area 220 at one time and data from device storage area 230 at another time; but at any given time the logical division between user storage area 220 and device storage area 230 is strictly maintained. Furthermore, some data may belong, for example, to both device descriptor 132 and compulsory data source 236, according to the functionalities described herein.

Controller 100 has the same functionality as in FIG. 1, and also the functionality of running the program code from extended device system 234 that ensures the persistence of compulsory files 226 in user storage area 220. Interface 102 and host 105 are as described with respect to FIG. 1.

It will be noted that storage device 210 may also double as a digital appliance, as taught in U.S. Pat. No. 7,035,949, which patent is incorporated by reference for all purposes as if fully set forth herein, as long as the functionalities described herein with respect to user storage area 220, device storage area 230, controller 100 and interface 102 are maintained. Thus, storage device 210 may include additional blocks, not shown in FIG. 2, which add functionalities of a digital appliance such as a digital voice recorder, a portable music player or a digital camera, and still operate as a portable storage device connectable to a host 105 under the teachings of the present invention.

Figure 3:
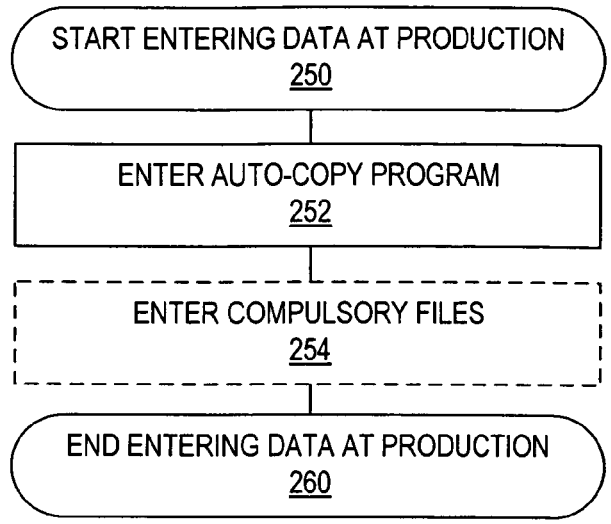
FIG. 3 is a flow chart describing an exemplary mode of data entry into the storage device of FIG. 2.
Figure 6A:
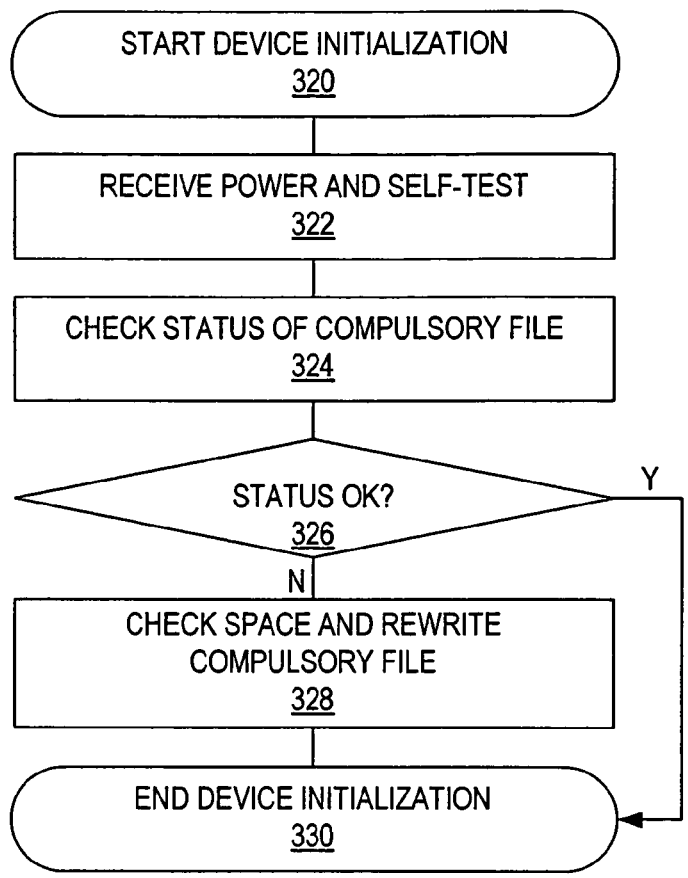
FIG. 6A is a flow chart describing an initialization procedure of the storage device of FIG. 2.
Figure 6B:
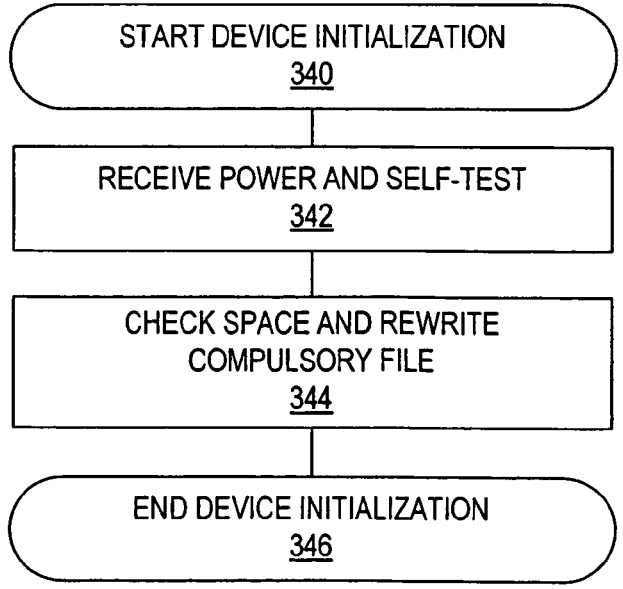
FIG. 6B is a flow chart describing an alternative initialization procedure of the storage device of FIG. 2.

FIG. 3 is a flow chart of the installation of the application software of the present invention, and optionally also of compulsory files, into device storage area 230 of FIG. 2, during the manufacture of storage device 210. A specific exemplary scenario is described herein for clarity. A manufacturer of storage device 210 has received an order from an insurance company for 100,000 USB flash storage devices to be given away as Christmas presents. The insurance company provides an Autorun file that displays a banner page with the company's logo and contact details upon the insertion of storage device 210 into the USB port of any compatible host 105. The insurance company wants this banner page to be persistent, i.e. not removable by the user. In step 250, during the final phase of manufacture, storage device 210 enters the phase of customization, by interfacing with a production robot that is authorized to enter any data into device storage area 230. In step 252, an auto-copy program, described below with reference to FIGS. 6A-6B, is written into device system 234. In step 254, the Autorun program file with the insurance company's banner page is entered into device storage area 230 as compulsory data source 236. The procedure is completed in step 260. In alternative embodiments, compulsory data sources 236 are added at a later stage, in addition to or instead of adding such files during manufacture, and then step 254 of FIG. 3 may be skipped.

Figure 4:
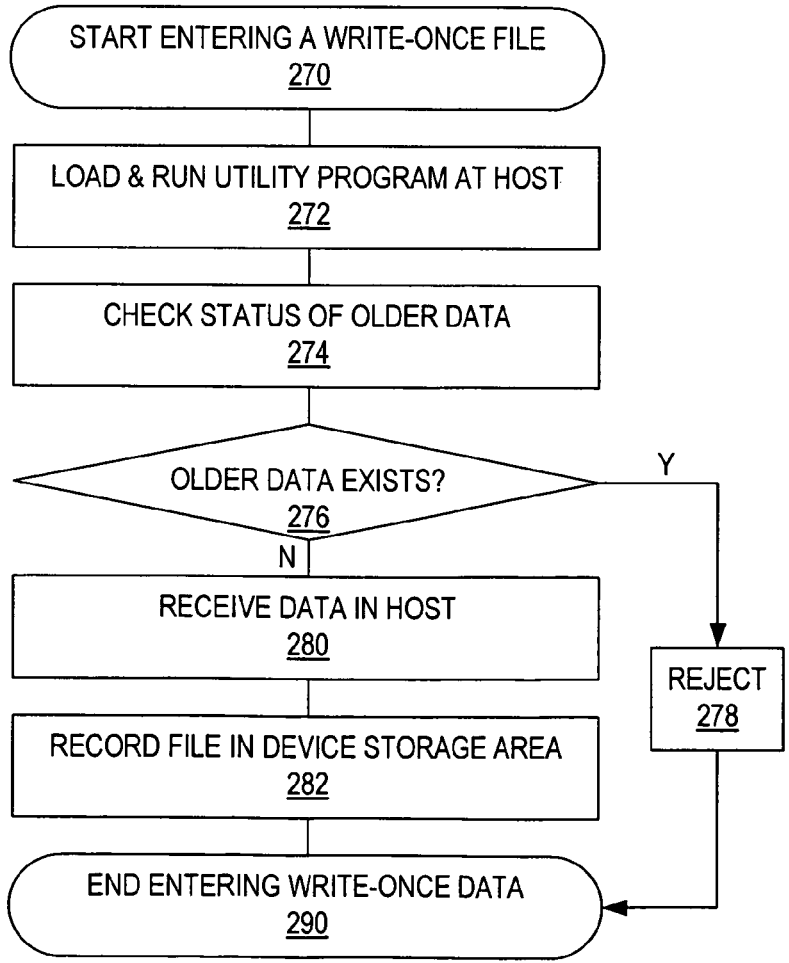
FIG. 4 is a flow chart describing a second exemplary mode of data entry into the storage device of FIG. 2.

FIG. 4 is a flow chart of a one-time installation of a compulsory data source 236 by the user. An exemplary scenario is when the original buyer of a portable storage device wants to irreversibly personalize the storage device to display his/her name and contact details, analogously to physical engraving of personal belongings. For this purpose, an Autorun program file with the user's name and contact details needs to be installed once, with subsequent attempts to modify or erase this file being prevented by device system 234. In step 270, the procedure starts with the user connecting a new storage device 210 to a host 105. In step 272 a utility program preinstalled in user files 122, or provided through a separate CD or downloaded through the Internet, is loaded onto and run on host 105. This utility program connects the user interface of host 105, controller 100 and device storage area 230. In step 274 controller 100 executes program code from device system 234 to check the existence of user data in compulsory data source 236. If such user data is found, i.e. if device 210 has already been personalized, then step 276 routes the procedure to step 278 for rejection. Otherwise, i.e. if in step 274 device 210 is found to have never been personalized, then step 276 routes the procedure to step 280, where the user is prompted by the utility program loaded in step 272 to enter his/her name and contact details, which causes in step 282 the recording of the personal details and/or of an Autorun file including such personal details into compulsory data source 236, and the procedure ends in step 290. It will be appreciated that the procedure of FIG. 4 allows the original user to personalize his/her storage device 210, but further attempts to re-personalize device 210 are rejected by step 276.

Figure 5:
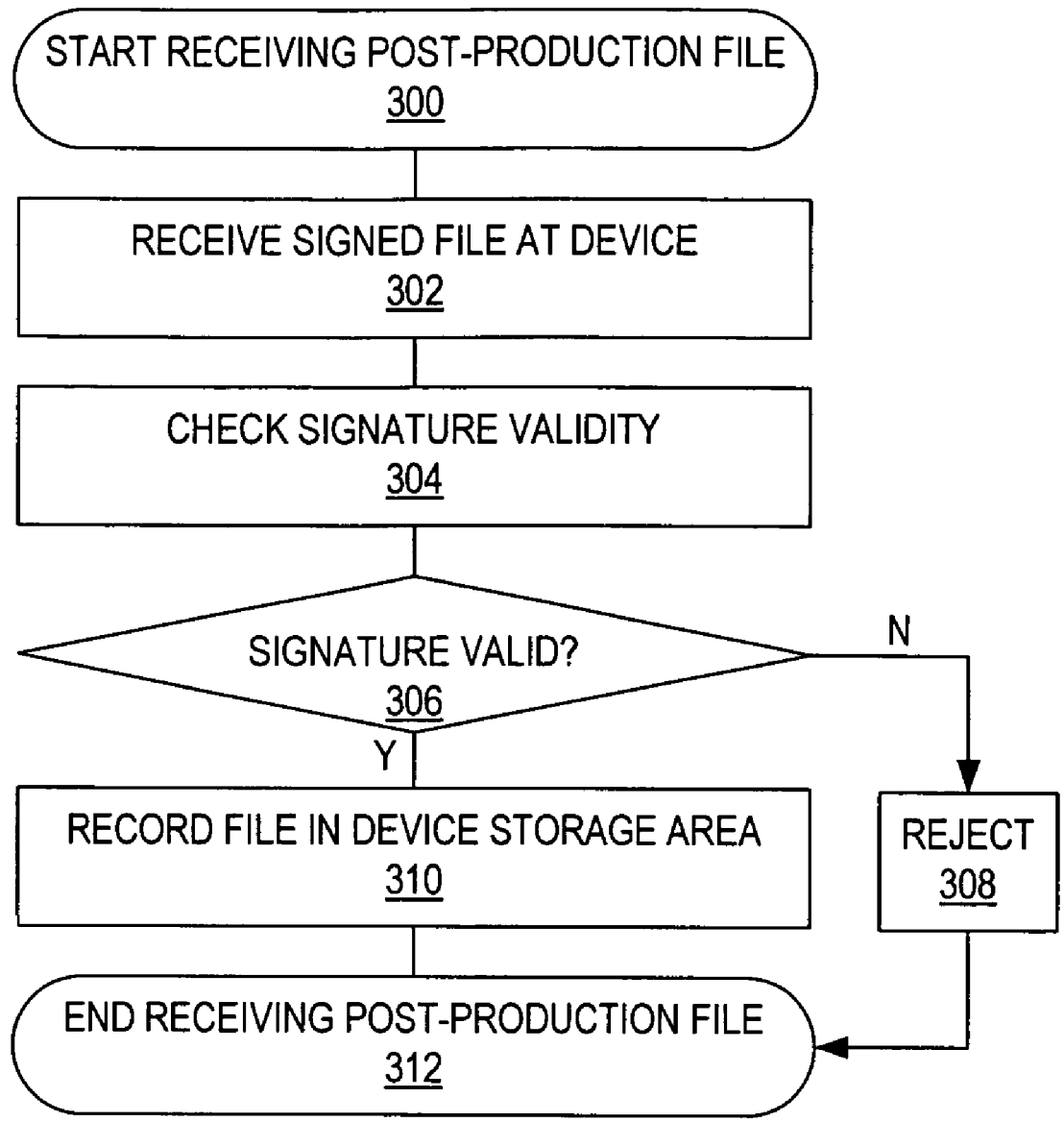
FIG. 5 is a flow chart describing a third exemplary mode of data entry into the storage device of FIG. 2.

FIG. 5 is a flow chart of another embodiment of the present invention, wherein the compulsory data can be modified by an authorized entity. Such an authorized entity is characterized by being able to digitally sign files in a way that can be validated by controller 100 under device system 234. In step 300 a file is received by the user at host 105, and a host-level utility program (not shown) attempts at step 302 to copy the file, or data from the file, into device storage area 230 as compulsory data source 236. In step 304 controller 100 under device system 234 examines the validity of the digital signature of the received file, and if no valid signature is found, then step 306 routes the procedure to rejection in step 308, and compulsory data source 236 remains intact. If in step 304 the signature has been found valid, then step 306 routes the procedure to step 310, where the received file or data therefrom is recorded into compulsory data source 236, possibly replacing an older version of the same file. The procedure ends in step 312.

An important feature of the present invention is that the files in compulsory data source 236 are not merely conventional read-only files whose permission levels can be modified by a user of host 105 who has appropriate privileges. Device system 234 is configured to allow only one change to the data in compulsory data source 236 subsequent to the manufacture of storage device 210 (FIG. 4) or to allow a change to the data in compulsory data source 236 only if an input file bears an appropriate digital signature (FIG. 5).

FIG. 6A is a flow chart of the initialization procedure of storage device 210 by controller 100 under device system 234 (see FIG. 2). If storage device 210 is a removable storage device, such initialization occurs automatically upon storage device 210 being connected to any host 105. If storage device 210 is embedded within host 105, then initialization occurs whenever host 105 is started ("hard boot") or restarted ("soft boot"). Thus in step 320 removable storage device 210 is connected to a host 105, or storage device 210 has previously been embedded in a host 105 that has just been started or restarted. In step 322 storage device 210 is energized and controller 100, executing code from device system 234, conducts normal initialization and self-testing that are customary in prior art storage devices. In step 324, controller 100, executing code from device system 234, checks whether the content of compulsory files 226 matches the content of compulsory data source 236. If the content of compulsory files 226 matches the content of compulsory data source 236, then step 326 routes the procedure toward conclusion in step 330. If the content of compulsory files 226 does not match the content of compulsory data source 236, then step 326 routes the procedure to step 328, where the content of compulsory files 226 is rewritten into user storage area 220 by controller 100, in accordance with the content of compulsory data source 236. Such writing 328 is preceded by checking the availability of space in user storage area 220 for accommodating the file, as customary in writing files onto any conventional prior art storage device.

FIG. 6B is a flow chart of an alternative procedure to that of FIG. 6A. The procedure start 340 and powering and self test 342 are the same as steps 320 and 322, respectively. However, the status check of steps 324 and 326 of FIG. 6A is eliminated, and in step 344 that is similar to step 328 of FIG. 6A, compulsory files 226 are written by controller 100 into user area 220 in accordance with the content of compulsory data source 236, even if such files already exist properly in user area 220. Thus, the procedures of FIGS. 6A and 6B yield similar results, and the choice between them is a matter of technical preference.

It should be noted that if the user uses host 105 to format user storage area 220, then compulsory files 226 are erased, but will be rebuilt the next time storage device 210 is initialized. A special case is that in which the user erases compulsory files 226 and then adds files to fill-up user storage area 220 so that there is no space for rebuilding compulsory files 226. In such a case, steps 328 or 344 do not write compulsory files 226 and storage device 210 does not have compulsory files 226 until the next time storage device 210 is initialized with sufficient free space to accommodate compulsory files 226. Alternatively, controller 100 always reserves enough space in user storage area 220 for compulsory files 226 to be recreated.

Compulsory files 226 can include Autorun banner pages, documents, applications, icons, favorite Internet links, etc. Compulsory files 226 are written by controller 100 executing code from device system 234 in accordance with the content of compulsory data source 236 that resides in the protected device storage area, out of the reach of host 105. In some cases, compulsory data source 236 includes an exact copy of a file to be copied to a compulsory file 226 in user storage area 220. In other cases, compulsory data source 236 may include raw data, such as a user name and contact detail, which are transformed into a compulsory Autorun file 226 by controller 100 executing a file-writing utility from device system 234.

The embodiments described above focused on the maintenance of persistent files. However, sometimes the compulsory data of interest is not in the form of files. For example, the volume label of a storage device, that is visible whenever the storage device needs to be accessed through the root directory of the host, may become persistent as described below.

The volume label is normally part of the file system of storage device 210 (FIG. 2), i.e. stored within service files 124 of user storage area 220. As such, the volume label is accessible by host 105, and can be reset upon formatting of storage device 210 under the control of a host 105. It may desirable, however, to keep such a volume label persistent, for similar reason as described above for defining and maintaining compulsory files. A commercial company may wish to preinstall its name as the volume label of storage devices it gives away, or a user may want to use the write-once approach to digitally "engrave" his/her name as the volume label of a storage device.

Figure 7:
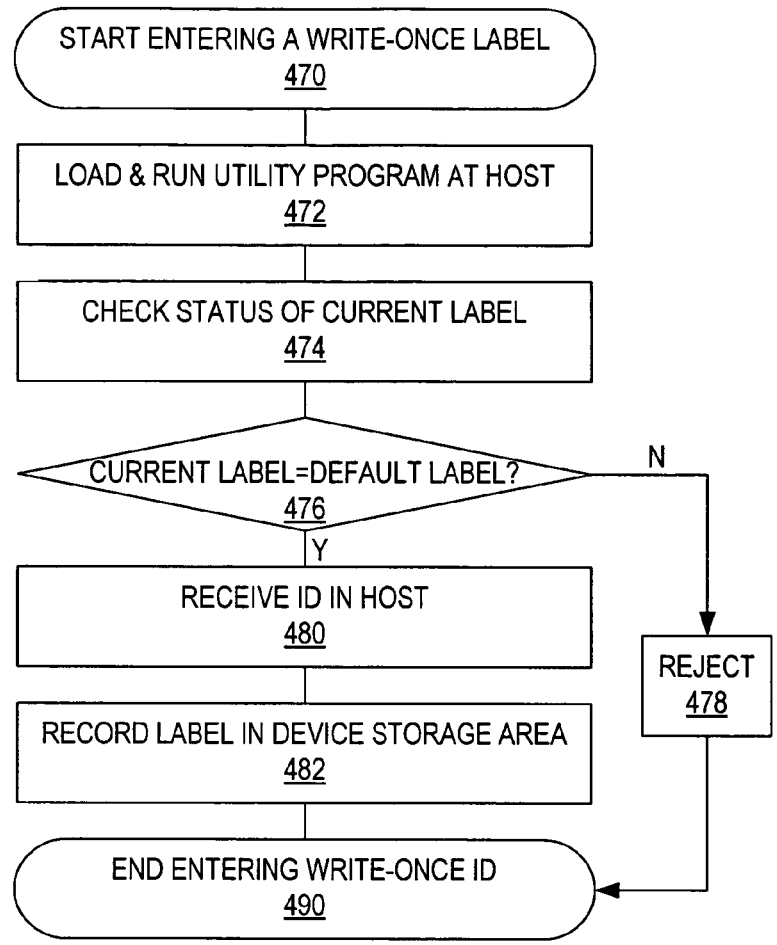
FIG. 7 is a flow chart describing a fourth exemplary mode of data entry into the storage device of FIG. 2.

FIG. 7 is a flow chart of the personalization of a storage device 210 (FIG. 2) by entering a user-selected volume label into compulsory data source 236. The procedure of FIG. 7 starts in step 470 with the user connecting storage device 210 to host 105. In step 472, a label-entry utility is loaded onto host 105, for example from user storage area 220, from a CD or from the Internet, and is then run on host 105. In step 474 the current volume label is examined by controller 100 executing code from device system 234, to check whether the current volume label has ever been set to a value different from the factory-pre-set default value. If the current volume label still has the default value, then step 476 routes the procedure to step 480, where the user is prompted to enter his/her selected label, for example his/her name. This label is entered in step 482 into compulsory data source 236 of device storage area 230, and the procedure ends in step 490. If checking the status of the current volume label in step 474 has shown that the current volume label has already been modified in the past (i.e. the current volume label is different than the default volume label), then step 476 routes the procedure to rejection in step 478, thus excluding the possibility of modifying an already-personalized device.

Figure 8:
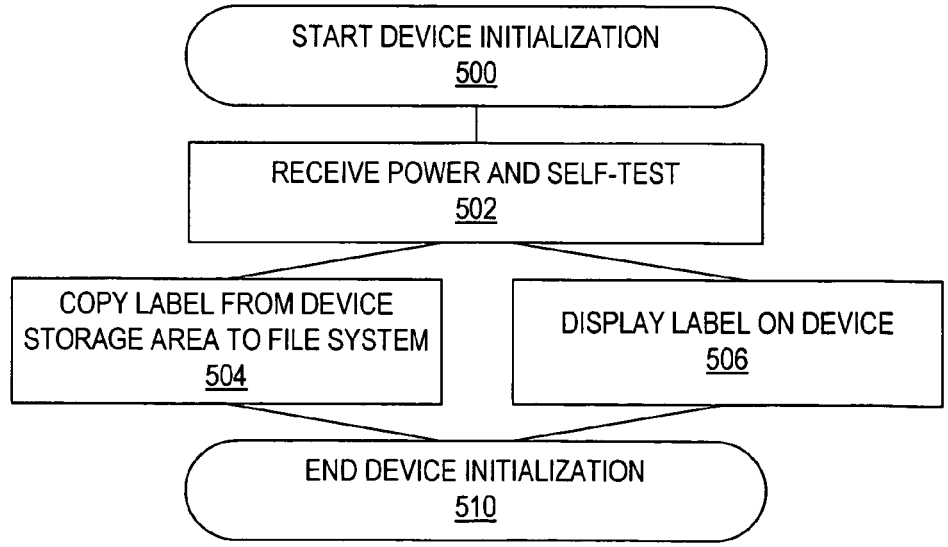
FIG. 8 is a flow chart describing a third alternative initialization procedure of the storage device of FIG. 2.

The flow chart of FIG. 8 shows how the volume label that is created under the procedure of FIG. 7, and that is then hidden in compulsory data source 236, surfaces to become visible through the file system of host 105. In step 500 storage device 210 (FIG. 2) is initialized, for example by connecting storage device 210 to host 105 or by turning on or restarting a host 105 in which storage device 210 has been embedded. In step 502, storage device 210 is energized and passes a conventional self test. In step 504, controller 100, executing code from device system 234, copies the volume label resident in compulsory data source 236 into the volume label record of the file system of storage device 210, maintained in service files 124, and in step 510 the device initialization is concluded. Additionally or alternatively to step 504, in step 506 the volume label from compulsory data source 236 is displayed on display 104 of FIG. 2. (The latter step may become redundant after the label is displayed for the first time, if display 104 uses "electronic paper" that retains the screen content even when power is turned off).

It will be noted that the write-once approach described above with respect to FIG. 7 can affect not only compulsory data source 236 (FIG. 2) for copying into user storage area 220 upon device initialization, but also post-production modification of device descriptor 132 in order to personalize the device for its original owner. Also, it will be appreciated that all the purposes and methods described above for including persistent data within a storage device can co-exist without conflict. Thus, a commercial company may include a compulsory banner page with a storage device it gives away, while the user of that device may personalize the device with his or her identification under the write-once provision.

While the invention has been described with respect to a limited number of embodiments, it will be appreciated that many variations, modifications and other applications of the invention may be made.

What is claimed is:

1. A method of managing a data storage device, comprising the steps of:
   (a) partitioning a data storage area of the storage device between a user storage area and a device storage area;
   (b) storing compulsory source data in said device storage area; and
   (c) persistently storing compulsory derivative data in said user storage area in accordance with said compulsory source data by checking whether content in the user storage area matches content of the compulsory source data upon initialization of the data storage device, and if the content in the user storage area does not match the content of the compulsory source data, then storing the compulsory derivative data in said user storage area, the initialization occurring automatically upon connection of the data storage device to a host, wherein said compulsory derivative data defines a welcome screen, the welcome screen being automatically displayed upon connection of the data storage device to the host.

2. The method of claim 1, wherein said partitioning is logical partitioning.

3. The method of claim 1, wherein said storing of said compulsory derivative data includes copying at least one file from said compulsory source data.

4. The method of claim 3, wherein one of said at least one file is an autorun file.

5. The method of claim 1, wherein said storing of said compulsory derivative data includes creating at least one file in said user storage area according to said compulsory source data.

6. The method of claim 5, wherein one of said at least one file is an autorun file.

7. The method of claim 1, wherein said compulsory derivative data include a volume label.

8. The method of claim 1, wherein said compulsory source data include a user identification.

9. The method of claim 1, wherein said storing of said compulsory source data is permanent.

10. The method of claim 1, further comprising the steps of:
    (d) providing:
        (i) replacement data for replacing said compulsory source data, and
        (ii) an authorization to replace said compulsory source data;
    (e) verifying said authorization; and
    (f) replacing said compulsory source data with said replacement data only if said verifying succeeds.

11. The method of claim 10, wherein said authorization includes a digital signature.

12. The method of claim 1 further comprising the steps of:
    (d) including a display apparatus in the data storage device; and
    (e) displaying at least a portion of said compulsory derivative data, using said display apparatus.

13. The method of claim 1, further comprising the step of:
    (d) copying at least a portion of said compulsory derivative data to a host.

14. The method of claim 1, wherein said compulsory derivative data include compulsory data.

15. The method of claim 1, wherein said user storage area is read-write.

16. A data storage device comprising:
    (a) a data storage area, partitioned between a user storage area and a device storage area; and
    (b) a controller for managing said data storage area by steps including:
        (i) storing compulsory source data in said device storage area, and
        (ii) persistently storing compulsory derivative data in said user storage area in accordance with said compulsory source data by checking whether content in the user storage area matches content of the compulsory source data upon initialization of the data storage device, and if the content in the user storage area does not match the content of the compulsory source data, then storing the compulsory derivative data in said user storage area, wherein said compulsory derivative data defines an Internet link;
    (c) an interface for reversibly coupling the data storage device to a host in order to exchange data with said host, said data exchange including copying at least a portion of said compulsory derivative data to said host; wherein the initialization occurs automatically upon coupling of the data storage device to the host.

17. The data storage device of claim 16, wherein said partition between said user storage area and said device storage area is a logical partition that is effected by said controller.

18. The data storage device of claim 16, wherein said controller is operative to store said compulsory source data permanently in said device storage area.

19. The data storage device of claim 16, wherein said controller is operative to replace said compulsory source data in said device storage area, contingent on successful verification of an authorization to replace said compulsory source data.

20. The data storage device of claim 16, further comprising:
    (d) a display apparatus for displaying at least a portion of said compulsory derivative data.

21. The data storage device of claim 16, wherein said compulsory derivative data include compulsory data.

22. The data storage device of claim 16, wherein said user storage area is read-write.

23. A data storage device comprising:
    (a) a data storage area having computer-readable data and computer-readable code embodied thereon, the computer-readable data including compulsory source data, the data storage area partitioned between a user storage area and a device storage area, the computer-readable code including program code for persistently storing compulsory derivative data in said user storage area in accordance with said compulsory source data by checking whether content in the user storage area matches content of the compulsory source data upon initialization of the data storage device, and if the content in the user storage area does not match the content of the compulsory source data, then storing the compulsory derivative data in said user storage area, wherein said compulsory derivative data defines a file placed at a root level of the device;
(b) an interface for permanently coupling the data storage device to a host in order to exchange data with said host, said data exchange including copying at least a portion of said compulsory derivative data to said host; wherein the initialization occurs automatically whenever the host is started or restarted.

24. The data storage device of claim 23, further comprising:
(c) a controller for executing said program code.

25. The data storage device of claim 23, wherein the computer-readable code also includes program code for effecting said partition between said user storage area and said device storage area.

26. The data storage device of claim 23, wherein said derivative data include compulsory data.

27. The data storage device of claim 23, wherein said user storage area is read-write.

28. A method of managing a data storage device, comprising the steps of:
(a) partitioning a data storage area of the storage device between a user storage area and a device storage area;
(b) storing compulsory source data in said device storage area; and
(c) persistently storing compulsory derivative data in said user storage area in accordance with said compulsory source data by checking whether content in the user storage area matches content of the compulsory source data upon initialization of the data storage device, and if the content in the user storage area does not match the content of the compulsory source data, then storing the compulsory derivative data in said user storage area, the initialization occurring automatically upon connection of the data storage device to a host, wherein said compulsory derivative data defines a logo, the logo being automatically displayed upon connection of the data storage device to the host.

29. A method of managing a data storage device, comprising the steps of:
(a) partitioning a data storage area of the storage device between a user storage area and a device storage area;
(b) storing compulsory source data in said device storage area; and
(c) persistently storing compulsory derivative data in said user storage area in accordance with said compulsory source data by checking whether content in the user storage area matches content of the compulsory source data upon initialization of the data storage device, and if the content in the user storage area does not match the content of the compulsory source data, then storing the compulsory derivative data in said user storage area, the initialization occurring automatically upon connection of the data storage device to a host, wherein said compulsory source data includes raw data, and wherein said storing the compulsory derivative data includes executing a file-writing utility to transform said raw data into an autorun file.

* * * * *